(12) United States Patent
Poolla et al.

(10) Patent No.: US 6,907,364 B2
(45) Date of Patent: Jun. 14, 2005

(54) METHODS AND APPARATUS FOR DERIVING THERMAL FLUX DATA FOR PROCESSING A WORKPIECE

(75) Inventors: Kameshwar Poolla, Berkeley, CA (US); Randall S. Mundt, Pleasanton, CA (US)

(73) Assignee: OnWafer Technologies, Inc., Dublin, CA (US)

( * ) Notice: Subject to any disclaimer, the term of this patent is extended or adjusted under 35 U.S.C. 154(b) by 0 days.

(21) Appl. No.: 10/664,810

(22) Filed: Sep. 16, 2003

(65) Prior Publication Data

US 2004/0107066 A1 Jun. 3, 2004

Related U.S. Application Data

(60) Provisional application No. 60/411,357, filed on Sep. 16, 2002.

(51) Int. Cl.[7] ................................................ G06F 19/00
(52) U.S. Cl. ........................... 702/65; 702/99; 702/130; 702/136; 700/121
(58) Field of Search ........................... 702/65, 99, 130, 702/85, 104, 136, 187; 700/108, 121

(56) References Cited

U.S. PATENT DOCUMENTS

| | | | |
|---|---|---|---|
| 5,444,637 A | 8/1995 | Smesny et al. | 364/556 |
| 5,551,983 A | 9/1996 | Shepard, Jr. et al. | 118/723 R |
| 5,683,759 A | 11/1997 | Shepard, Jr. et al. | 427/569 |
| 5,884,235 A | 3/1999 | Ebert | 702/87 |
| 5,969,639 A | 10/1999 | Lauf et al. | 340/870.17 |
| 6,169,486 B1 | 1/2001 | Berkcan et al. | 340/584 |
| 6,542,835 B2 | 4/2003 | Mundt | 702/65 |
| 6,561,796 B1 | 5/2003 | Barrera et al. | 432/5 |
| 6,579,731 B2 | 6/2003 | Yun | 438/14 |
| 6,642,853 B2 | 11/2003 | Hunter | 340/870.16 |
| 6,691,068 B1 | 2/2004 | Freed et al. | 702/187 |
| 6,738,722 B2 * | 5/2004 | Polla et al. | 702/104 |
| 6,741,945 B2 * | 5/2004 | Polla et al. | 702/104 |

OTHER PUBLICATIONS

U.S. Appl. No. 60/285,439, filed Apr. 19, 2001.
U.S. Appl. No. 60/411,357, filed Sep. 16, 2002.

* cited by examiner

Primary Examiner—John Barlow
Assistant Examiner—Hien Vo
(74) Attorney, Agent, or Firm—Larry Williams

(57) ABSTRACT

Presented are methods, systems, and apparatus for deriving heat flux information and using heat flux information for a workpiece used in temperature sensitive processes.

21 Claims, 3 Drawing Sheets

METHODS AND APPARATUS FOR DERIVING THERMAL FLUX DATA FOR PROCESSING A WORKPIECE

CROSS-REFERENCES

The present application claims benefit of U.S. Patent Application Ser. No. 60/411,357, filed Sep. 16, 2002, entitled, "METHODS AND APPARATUS FOR THERMAL FLUX MEASUREMENTS." The present application is related to U.S. patent application Ser. No. 09/643,614, filed on Aug. 22, 2000, now U.S. Pat. No. 6,691,068, U.S. patent application Ser. No. 09/816,648, filed on Mar. 22, 2001, now U.S. Pat. No. 6,542,835, U.S. Provisional Patent Application No. 60/285,439 titled "METHODS, APPARATUS, AND COMPUTER PROGRAM PRODUCTS FOR OBTAINING DATA FOR PROCESS OPERATION, OPTIMIZATION, MONITORING, AND CONTROL," filed Apr. 19, 2001. All of these applications are incorporated herein, in their entirety, by this reference.

BACKGROUND

This invention relates to improved methods, apparatus, and computer program products for applications such as processing workpieces, more particularly, processing workpieces for electronic device fabrication.

Plasma etching is a vital processing step in the manufacture of integrated circuits. In plasma etching, typically species from a glow discharge plasma comprising reactive ions and neutral species are accelerated towards a workpiece such as a silicon wafer. Parts of the wafer are masked by a protective layer of photoresist. The plasma etches the unprotected areas of the silicon wafer.

Generally, plasma-etching processes can generate considerable heat by two mechanisms—exothermic reactions at the wafer surface, and physical bombardment of the wafer by the plasma. In addition, etching processes can be very sensitive to temperature. For these two reasons, the silicon wafer is "chucked" by placing it in intimate thermal contact with a cooling chuck that is maintained at a steady temperature. By chucking the wafer, heat generated at the wafer surface can be safely removed to the chuck. In addition, chucking contributes to maintaining the wafer at a uniform temperature set point. Thermal contact between the wafer and the chuck is often assisted using helium gas in the gap between the wafer and the chuck.

For effective equipment design, process optimization, or fault detection and isolation, it is desirable to deduce the pattern of heat flows from the plasma to the wafer, and from the wafer to the chuck. It is conceivable that thermal flux sensors such as Gardon gauges could be arranged in an array on the wafer surface to determine the thermal flux from the plasma. These sensors directly sense the thermal flux, typically by measuring the temperature drop across a distance. A second set of thermal flux sensors can be placed near the bottom surface of the wafer to determine the thermal flux to the chuck. Alternately, the thermal flux to the chuck could be deduced from sensors mounted on the chuck, but this would interfere with the chucking operation. These approaches using thermal flux sensors have not been tried before. For plasma applications, these approaches would require using wireless arrays of thermal flux sensors. Commercially available thermal flux sensors would not be suitable, as they need external power and a means to access the measured fluxes. Recently developed MEMS based structures could be used but they would be expensive.

Clearly, there are numerous applications requiring reliable and efficient methods and apparatus for deriving thermal flux information. For processing workpieces that involves several heat sources and/or heat sinks, there is a need for methods and apparatus capable of resolving the net heat flux to the workpiece into components of heat flux from the various heat sources or sinks. Examples of important applications are the plasma processing of workpieces such as semiconductor wafers, flatpanel displays, lithography masks, and other electronic devices.

SUMMARY

One aspect of the present invention includes a method that uses temperature measurements and special experiments to resolve the net heat flux for a workpiece into components to or from various heat sources or heat sinks. Another aspect of the present invention includes a system for deriving thermal flux information. Another aspect of the present invention includes methods of using thermal flux information. Still another aspect of the present invention includes computer program products for deriving thermal flux information.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

Figure 1:
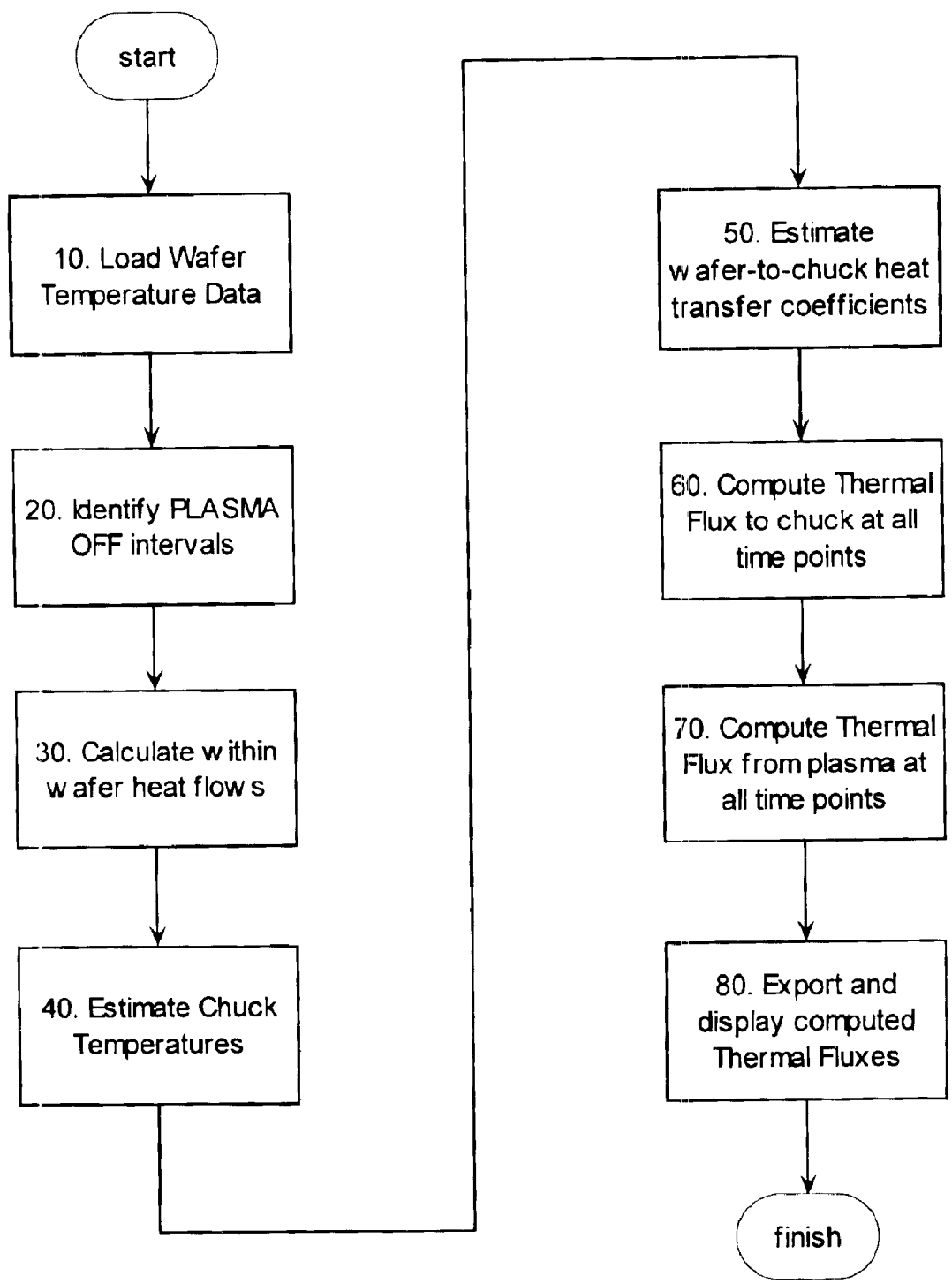
FIG. 1 is a flowchart for an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

The operation of embodiments of the present invention will be discussed below, primarily, in the context of obtaining thermal flux data for processing semiconductor wafers for fabricating electronic devices. However, it is to be understood that embodiments in accordance with the present invention are not limited to semiconductor wafer processing. Examples of other embodiments of the present invention are flat panel display processing and lithography mask processing. Furthermore, most of the discussion of embodiments of the present invention is directed toward plasma etch applications. It is to be understood that embodiments of the present invention can be used for a wide variety of applications such as plasma etching, plasma deposition, plasma enhanced chemical vapor deposition, chemical vapor deposition, and sputter deposition. In the following description of the figures, identical reference numerals have been used when designating substantially identical elements or steps that are common to the figures.

In typical plasma processes such as those used for processing semiconductor wafers, the temperature at the wafer surface is the result of heat flow from a plasma and to a cooling chuck. In addition, there can be situations, such as when the wafer is not heated uniformly, in which there will be heat flow within the wafer itself. For oxide etch processes, it is imperative that the wafer be well chucked to effectively transport heat away from the wafer. For polysilicon etch processes, good chucking assures that temperature is tightly controlled across the wafer, ensuring spatially uniform processing. In both applications, it is necessary to engineer the process to balance the thermal flux from the plasma with the thermal flux to the chuck.

One embodiment of the present invention includes a method that can be implemented as an algorithm that allows resolving the net thermal flux to the wafer into the contributing components. The thermal flux information can be used in many ways. For examples, the thermal flux information can be used to verify that thermal transport in the process is well balanced in time and across the wafer; the thermal flux information can be used to evaluate and optimize process recipes, to diagnose problems, etc.

Some embodiments of the present invention include a method that involves running a specific experiment on a process chamber for processing a workpiece for which the process is temperature sensitive and there are multiple heat sources or heat sinks that contribute to the workpiece temperature. The experiment includes measuring the temperature experienced by the workpiece. For the experiment, each of the various heat sources or sinks is initially turned OFF or is otherwise at a non-activated or null state. Then one of the heat sources or sinks is turned ON; this will heat or cool the substrate or temperature measuring apparatus, resulting in a change of temperature of the substrate or apparatus. This temperature trajectory is recorded. Using temperature trajectory data, it is possible to infer the thermal conduction coefficients between the heat source or sink turned ON and the substrate. This can be done unambiguously because there is a single source.

The experiment is repeated with each of the other sources or sinks. In this manner, it is possible to deduce the thermal conduction coefficients between the sources or sinks and the substrate. Now, it is possible to run an experiment with any combination of the sources or sinks ON, and at various powers. The substrate temperature trajectories are recorded for the experiments. Since all the thermal conduction coefficients have been determined from the experiments and the geometry and material properties of the substrate are known, it is possible to calculate the pattern of thermal fluxes.

One embodiment of the present invention includes measuring a substrate temperature trajectory at various spatial locations for the substrate. For example, the measurement system could include a Sensor Wafer such as those available from OnWafer Technologies, Inc. (Pleasant Hill, Calif.) with temperature sensing elements arranged to measure temperature of the top surface of the substrate. Optionally, the sensing elements may be embedded on the top surface of the substrate.

An embodiment of the present invention will now be presented that includes steps applicable to a plasma etch process for a semiconductor wafer. In order to resolve the heat fluxes to the wafer surface according to this embodiment of the present invention, temperature measurements at the wafer surface are acquired. The temperature measurements may be acquired using techniques such as those that involve a Sensor wafer such as those described in U.S. patent application Ser. No. 09/643,614, filed on 22 Aug. 2000. The process recipe includes at least one plasma-OFF interval. This is an interval during which the wafer is chucked, but is not being significantly heated by the plasma. Equivalently, the plasma heat flux, $\Phi_p$, equals zero during plasma-OFF intervals. During plasma-OFF intervals, the wafer temperature returns exponentially to the chuck temperature.

At all times, the evolution of the wafer surface temperature is governed by the standard heat equation (1). Here, T is the temperature at the wafer surface, $\Phi_p$ is the heat flux from the plasma, and $\Phi_c$ is the heat flux to the chuck. The Laplacian term $\nabla^2 T$ represents heat flow within the wafer, and $k_w$, kp, and $k_c$ are known constants that depend only on the wafer geometry and thermal properties of silicon.

$$\frac{dT}{dt} = k_w \nabla^2 T + k_p \Phi_p - k_c \Phi_c \tag{1}$$

Note that T, $\Phi_p$, and $\Phi_c$ depend on time t and the spatial co-ordinates (x,y) at the wafer surface. Equation (1) therefore captures the balance of heat fluxes at every point on the wafer surface.

Heat flow to the chuck is modeled as simple conduction, represented by equation (2), through the helium in the chuck-wafer interface. The chuck conduction coefficient α depends on spatial co-ordinates (x,y).

$$\Phi_c = \alpha(T - T_c) \tag{2}$$

During plasma-OFF intervals, $\Phi_p$ is zero, and combining equations (1) and (2), the heat equation becomes $$\frac{dT}{dt} = k_w \nabla^2 T - k_c \alpha(T - T_c) \tag{3}$$

Having knowledge of the measurements of T from the temperature Sensor Wafer or other measurement system, it is possible to compute the within wafer thermal flux term $\nabla^2 T$ as follows. First, note equation (4) shown as:

$\nabla^2 T(x,y,t)$=Average of T over a circle of small radius centered at $(x,y)-T(x,y,t)$. (4)

The average in equation (4) can be determined in a number of ways that will be clear to one of ordinary skill in the art. One alternative is to spatially interpolate the temperatures T onto a fine spatial grid using standard methods such as Kriging or linear interpolation based on a Delaunay triangulation.

Once the within wafer thermal flux term has been computed, use equation (3) to estimate the chuck temperature $T_c$ and the chuck conduction coefficients α at various spatial co-ordinates (x,y). One way to do this is by solving an optimization problem to best fit the available data to equation (3). For example, it is possible to choose to determine the chuck temperature $T_c$ and the chuck conduction coefficients α by minimizing the Euclidean metric shown in equation (5):

$$\min\left\|\frac{dT}{dt} - k_w\nabla^2 T + k_c\alpha(T - T_c)\right\| \quad (5)$$

This is a nonlinear programming problem as the unknown quantities appear in a bilinear form. Our current embodiment of the invention solves (5) using a Least Squares procedure. More specifically, note that by averaging equation (5) spatially across the substrate, equation (6) is obtained:

$$\min\left\|\frac{d\overline{T}}{dt} + k_c\overline{\alpha}(\overline{T} - T_c)\right\| \quad (6)$$

Here $\overline{T}$ is the spatial mean temperature at time t. This follows from the fact that the within wafer thermal fluxes $\nabla^2 T$, average to zero at any time. The optimization problem represented by equation (6) is a standard least squares problem, and can be easily solved to supply an estimate of the chuck temperature $T_c$. Following this, we return to the optimization represented by equation (5) with this estimated value of $T_c$ being fixed. It becomes apparent that the problem is again a least squares problem in the unknown parameters $\alpha$.

Finally, during plasma-ON intervals it is possible to compute the fluxes $\Phi_p$ and $\Phi_c$ using equations (1) and (2) as equations (7) and (8):

$$\Phi_c = \alpha(T - T_c) \quad (7)$$

$$k_p\Phi_p = \frac{dT}{dt} - k_w\nabla^2 T + k_c\Phi_c. \quad (8)$$

For the embodiment just presented, several assumptions and approximations were incorporated into the calculations, which include: The chuck is at a constant, uniform temperature during each plasma-OFF interval. The chuck temperature does not have an appreciable change across a plasma-ON and plasma-OFF sequence. Chucking effectiveness (i.e. the thermal conduction coefficients) is constant during each plasma-ON interval. Heat flow from other sources such as chamber walls is negligible. And, lateral heat flow at the wafer edge is negligible.

Figure 2:
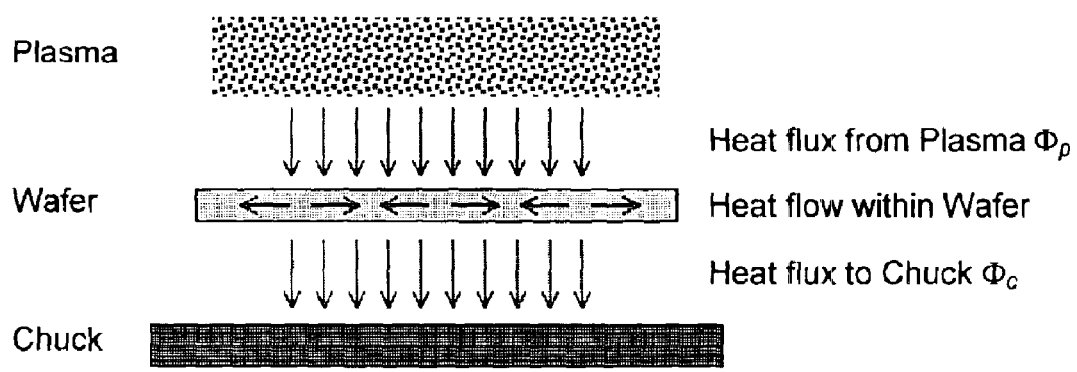
FIG. 2 is a diagram of possible heat lows in a plasma chamber.

Reference is now made to FIG. 1 where there is shown a flowchart for a thermal flux calculation algorithm according to one embodiment of the present invention. FIG. 2 is also provided to show an example of the various heat fluxes that can be described in some embodiments of the present invention including the embodiment of FIG. 1.

FIG. 1 shows the first step after starting the algorithm is Step 10, Load Wafer Temperature Data. Step 10 involves loading the measured wafer temperature data so that the data are available to the calculation algorithm. Optionally, this may include retrieving temperature measurements from a memory storing the temperature measurements, retrieving temperature measurements from an information transfer interface, or retrieving temperature measurements via a connection with a temperature measuring device. Alternatively, an information input may be provided so that the data can be transferred for access by the calculation algorithm.

Step 20, Identify Plasma OFF Intervals, is an optional step for some embodiments of the present invention. The nature of the process and/or the nature of the data provided to the algorithm determine whether this step is needed or not needed. Typically, a user essentially with knowledge of the wafer-processing recipe does this step. The step involves partitioning the data for different wafer processing steps so that the algorithm will have the appropriate data for the recipe steps needed for performing the calculations. In one embodiment of the present invention, computer executable software is provided to assist the user in fine-tuning the start and finish times of the plasma OFF interval. At least one plasma-OFF interval is included.

Step 30, Calculate Within Wafer Heat Flows, involves performing the calculation of equation (4) presented above. This embodiment includes interpolating the measured data onto a fine spatial scale. The interpolation improves the fidelity and is included in preferred embodiments of the present invention; however, it is not essential for all of the embodiments of the present invention. In addition, in a preferred embodiment of the present invention, the spatial scale is based on a rectangular grid for variable addressing simplicity. In other words, the within-wafer heat flow $\nabla^2 T$ at a grid point is then simply the average temperature at adjoining grid points minus the temperature at the grid point itself.

Step 40, Estimate Chuck Temperatures, and Step 50, Estimate Wafer-to-Chuck Conduction Coefficients, involves solving the optimization problem using equation (5) during every plasma-OFF interval. Our current embodiment of the invention solves equation (5) using a least squares procedure as described in the supra. Other approaches are possible. Alternatively, other similar optimization problems could be solved here to estimate the chuck temperature and the chuck conduction coefficients. Ultimately however, these are all attempts to best fit the coefficients to the data as modeled by equation (3).

Step 60, Compute the Thermal Flux to the Chuck at All-time Points and Step 70, Compute the Thermal Flux from the Plasma at All-time Points, are straightforward and simply involve making the calculations of equations (7) and (8). Optionally, the results of the computations may be smoothed to remove spurious noise.

Step 80, Export and Display Computed Fluxes, is a matter of designer choice. A variety of display options may be used to best reveal spatial patterns in the data, or to compare the fluxes.

Figure 3:
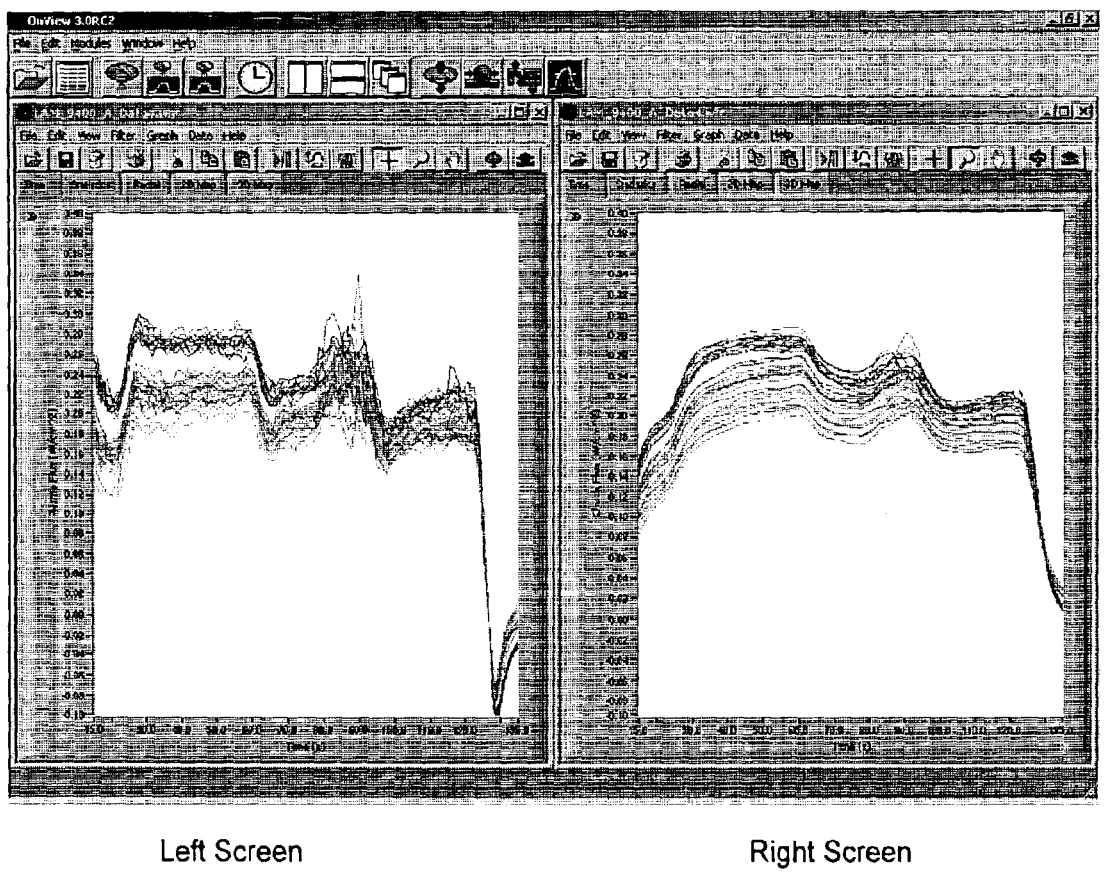
FIG. 3 is a plot of data from an embodiment of the present invention.

Reference is now made to FIG. 3 wherein there are shown example results obtained from an embodiment of the present invention. The results are obtained for a plasma process for processing semiconductor wafers. The process was performed on a Lam Research Corporation (Fremont, Calif.) plasma etcher, Model 9400. FIG. 3 shows two computer screen images. The Left Screen shows thermal fluxes from the plasma to a wafer as computed according to an embodiment of the present invention. The Right Screen shows thermal fluxes to the chuck as computed according to an embodiment of the present invention. In both screens, the horizontal axis is time, and the vertical axis is flux in Kilowatts/m². Also, note that several traces are shown. These correspond to various spatial locations on the wafer. It is evident that the thermal fluxes are in good balance in this example, indicating that the process is well optimized in transporting heat away from the wafer.

Another embodiment of the present invention includes a method of deriving heat flux data for a workpiece having a top surface and a bottom surface in a process chamber for a temperature sensitive process. The process chamber includes a support for supporting the bottom surface of the workpiece and regulating the temperature of the workpiece. The process includes using at least two process parameters activated for an amount of time; the method is preferably performed using a sensor apparatus for measuring temperature data, processing, storing, and transmitting the temperature data. The sensor apparatus includes at least one temperature sensor, an information processor, a memory for storing information, a wireless information transmitter, a wireless information receiver, and a base for supporting the sensor, the information processor, the memory, the information transmitter, and the information receiver. The method includes the steps of: Loading the sensor apparatus into the process chamber. Collecting and storing non-process temperature data using the sensor apparatus with all of the at least two process parameters at null. Collecting and storing separate parameter process temperature data using the sensor apparatus with each of the at least two process parameters separately activated. Collecting and storing combined parameter process temperature data using the sensor apparatus with all of the at least two process parameters for processing the workpiece jointly activated. And, calculating the heat flux into and out of the workpiece using temperatures measured in the earlier steps along with intrinsic thermal properties of the workpiece.

Optionally, for the method, the workpiece may comprise a semiconductor wafer for fabricating electronic devices, a substrate for a lithography mask, or a substrate for a flat-panel display. In addition, the temperature sensitive process may be selected from the group consisting of plasma etching, plasma deposition, plasma enhanced chemical vapor deposition, chemical vapor deposition, and sputter deposition.

Other embodiments of the present invention include a method of maintaining a process chamber for performing a temperature sensitive process on a semiconductor wafer. The process chamber includes a support such as a chuck for supporting the bottom surface of the wafer and regulating the temperature of the wafer. The method includes the step of providing target heat flux values, $F_T$, for heat flux into and out of the wafer for predetermined conditions. Another step includes making new measurements of temperatures experienced by the semiconductor wafer for the predetermined conditions, and deriving new heat flux values, $F_N$, using the new temperatures. Still another step includes comparing the target heat flux, $F_T$, to the new heat flux, $F_N$, so as to assign a status for the process chamber so that the process chamber status is operational if $F_T$ and $F_N$ are substantially equal or malfunctioning if $F_T$ and $F_N$ are not substantially equal.

In a further embodiment of the method, $F_T$ represents a target heat flux for the top surface of the wafer and a target heat flux for the support and $F_N$ represents a new heat flux for the top surface of the wafer and a new heat flux for the support wherein the top surface heat flux and the support heat flux each correspond to separate operating parameters for the process chamber and further comprising comparing the target heat flux and new heat flux for each operating parameter for the process chamber. In a preferred embodiment of the method, the top surface heat flux results from a glow discharge plasma.

Another embodiment of the present invention includes a method of operating a manufacturing facility for processing semiconductor wafers using temperature sensitive processes. The method includes the steps of: Providing at least one process chamber capable of processing the wafers, wherein the process chamber is part of the manufacturing facility. Providing a sensor apparatus for measuring temperatures experienced by the wafer and capable of wirelessly collecting and transmitting or storing temperature data from within the process tool. Providing target heat flux values, $F_T$, for heat flux into and out of the wafer for predetermined conditions. Making new measurements of temperatures experienced by the semiconductor wafer for the predetermined conditions. Deriving new heat flux values, $F_N$, using the new temperature measurements. Comparing the target heat flux, $F_T$, to the new heat flux, $F_N$, to assign a status for the process chamber so that the process chamber status is operational if $F_T$ and $F_N$ are substantially equal or malfunctioning if $F_T$ and $F_N$ are not substantially equal.

Embodiments of the present invention have many applications. These include, but are not limited to the examples which follow. One embodiment of the present invention involves equipment design applications such as the design of plasma equipment for processing electronic devices and other products typically produced using plasmas. Embodiments of the present invention are particularly valuable for designing very complex equipment such as plasma equipment. Embodiments of the present invention may directly allow a user to evaluate the effectiveness of chucking systems, such as electrostatic chucking systems, in maintaining uniform temperatures at a wafer surface during processing. For some plasma processing applications, embodiments of the present invention also enable the user to evaluate spatial uniformity and stability of the plasma itself.

Another embodiment of the present invention involves diagnostic applications. More specifically, embodiments of the present invention may enable a user to accurately locate (and thus identify and correct) problems in plasma etching equipment. Some of the problems that may be identified using embodiments of the present invention are hot spots, local instabilities, chuck inefficiency, etc.

Yet, another embodiment of the present invention involves process optimization. Embodiments of the present invention may enable a user to optimize process parameters in terms of thermal conditions at the wafer surface. Examples of process parameters include: backside helium pressure, chuck set point temperature, etc.

Alternative embodiments of the present invention will be clear to those of ordinary skill in the art in light of the present disclosure. For example, a variety of temperature sensing devices can be used in embodiments of the present invention to measure the temperature trajectories at the wafer surface, directly or indirectly. As an option, the chuck temperature at various spatial points could be directly measured using sensors built into the chuck for some embodiments of the present invention. Various optimization algorithms and fitting techniques could be used to estimate the chuck conduction coefficients α for some embodiments of the present invention. Embodiments of the present invention could be used on data records with multi plasma-OFF intervals for better accuracy.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of,"

or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A method of deriving heat flux data for a workpiece having a top surface and a bottom surface in a process chamber for a temperature sensitive process, the process chamber includes a support for supporting the bottom surface of the workpiece and regulating the temperature of the workpiece, the process includes using at least two process parameters activated for an amount of time, the method being performed using a sensor apparatus for measuring temperature data, processing, storing, and transmitting the temperature data, the sensor apparatus having at least one temperature sensor, an information processor, a memory for storing information, a wireless information transmitter, a wireless information receiver, and a base for supporting the sensor, the information processor, the memory, the information transmitter, and the information receiver, the method comprising the steps of:
   A. loading the sensor apparatus into the process chamber;
   B. collecting and storing non-process temperature data using the sensor apparatus with all of the at least two process parameters turned off;
   C. collecting and storing separate parameter process temperature data using the sensor apparatus with each of the at least two process parameters separately activated;
   D. collecting and storing combined parameter process temperature data using the sensor apparatus with all of the at least two process parameters for processing the workpiece jointly activated; and
   E. calculating the heat flux into and out of the workpiece using temperatures measured in steps B–D and intrinsic thermal properties of the workpiece.

2. The method of claim 1 wherein the workpiece comprises a semiconductor wafer for fabricating electronic devices, a substrate for a lithography mask, or a substrate for a flatpanel display.

3. The method of claim 1 wherein the temperature sensitive process is selected from the group consisting of plasma etching, plasma deposition, plasma enhanced chemical vapor deposition, chemical vapor deposition, and sputter deposition.

4. The method of claim 1 wherein the workpiece comprises a semiconductor wafer for fabricating electronic devices and wherein the temperature sensitive process includes a plasma etching process.

5. The method of claim 1 wherein the workpiece comprises a flat panel display substrate and wherein the temperature sensitive process includes a plasma etching process.

6. A method of maintaining a process chamber for performing a temperature sensitive process on a semiconductor wafer, the process chamber includes a support for supporting the bottom surface of the wafer and regulating the temperature of the wafer, the method comprising the steps of:
   A. providing target heat flux values, $F_T$, for heat flux into and out of the wafer for predetermined conditions;
   B. making new measurements of temperatures experienced by the semiconductor wafer for the predetermined conditions;
   C. deriving new heat flux values, $F_N$, using the temperatures from step B;
   D. comparing the target heat flux, $F_T$, to the new heat flux, $F_N$, to assign a status for the process chamber so that the process chamber status is operational if $F_T$ and $F_N$ are substantially equal or malfunctioning if $F_T$ and $F_N$ are not substantially equal.

7. The method of claim 6 wherein $F_T$ represents a target heat flux for the top surface of the wafer and a target heat flux for the bottom surface of the wafer and $F_N$ represents a new heat flux for the top surface of the wafer and a new heat flux for the bottom surface of the wafer wherein the top surface heat flux and the bottom surface heat flux each correspond to a separate operating parameter for the process chamber and step B further comprising comparing the target heat flux and new heat flux for each operating parameter for the process chamber.

8. The method of claim 6 wherein the temperature sensitive process is selected from the group consisting of plasma etching, plasma deposition, plasma enhanced chemical vapor deposition, chemical vapor deposition, and sputter deposition.

9. The method of claim 7 wherein the top surface heat flux results from a glow discharge plasma.

10. The method of claim 6 wherein step A comprises deriving heat flux values for the wafer, the temperature sensitive process includes using at least two process parameters activated for an amount of time, step A being performed using a sensor apparatus for measuring temperature data, processing, storing, and transmitting the temperature data, the sensor apparatus having at least one temperature sensor, an information processor, a wireless information transmitter, and a base for supporting the sensor, the information processor, the memory, the information transmitter, and the information receiver, step A comprising the steps of:
   i. loading the sensor apparatus into the process chamber;
   ii. collecting and storing non-process temperature data using the sensor apparatus with all of the at least two process parameters turned off;
   iii. collecting and storing separate parameter process temperature data using the sensor apparatus with each of the at least two process parameters separately activated;
   iv. collecting and storing combined parameter process temperature data using the sensor apparatus with all of the at least two process parameters for processing the wafer jointly activated; and
   v. calculating the heat flux into and out of the workpiece using temperatures measured in steps ii–iv and intrinsic thermal properties of the wafer.

11. A method of operating a manufacturing facility for processing wafers using temperature sensitive processes, the method comprising the steps of:
   A. providing at least one process chamber capable of processing the wafers, wherein the process chamber is part of the manufacturing facility;
   B. providing a sensor apparatus for measuring temperatures experienced by the wafer and capable of wirelessly collecting and transmitting or storing temperature data from within the process tool;
   C. providing target heat flux values, $F_T$, for heat flux into and out of the wafer for predetermined conditions;

D. making new measurements of temperatures experienced by the semiconductor wafer for the predetermined conditions;

E. deriving new heat flux values, $F_N$, using the temperatures from step D;

F. comparing the target heat flux, $F_T$, to the new heat flux, $F_N$, to assign a status for the process chamber so that the process chamber status is
   i. operational if $F_T$ and $F_N$ are substantially equal or
   ii. malfunctioning if $F_T$ and $F_N$ are not substantially equal.

12. A computer readable medium encoded with computer executable steps for deriving heat flux values for managing a plasma process chamber, the chamber being capable of generating a plasma, the chamber having a chuck for supporting a workpiece in the plasma, at least one of the heat flux values being a plasma heat flux, at least one of the heat flux values being a chuck heat flux, the steps comprising:

A. obtaining temperature meausurements, T(x,y,t), representing the temperature of the workpiece in the chamber in the presence of the plasma;

B. using the temperature measurements, T(x,y,t), to compute the within workpiece thermal flux term $\nabla^2 T(x, y, t)$ using the equation $\nabla^2 T(x,y,t)$=Average of $T$ over a circle of small radius centered at $(x,y)$ – $T(x,y,t)$;

C. estimating the chuck temperature, $T_c$, and the chuck conduction coefficients, $\alpha$, for spatial co-ordinates (x,y) by determining a best fit of the temperature measurements to the equation $$\frac{dT}{dt} = k_w \nabla^2 T - k_c \alpha (T - T_c);$$

and

D. computing the plasma heat flux, $\Phi_p$, and the chuck heat flux, $\Phi_c$, using the equations $\Phi_c = \alpha(T - T_c)$ and $$k_p \Phi_p = \frac{dT}{dt} - k_w \nabla^2 T + k_c \Phi_c.$$

13. The medium of claim 12 werein step A comprises retrieving temperature measurements from a memory storing the temperature measurements, retrieving temperature measurements from an information transfer interface, or retrieving temperature measurements via a connection with a temperature measuring device.

14. The medium of claim 12 wherein step B comprises spatially interpolating the temperatures T onto a fine spatial grid.

15. The medium of claim 12 wherein step B comprises spatially interpolating the temperatures T onto a fine spatial grid using standard Kriging methods or linear interpolation methods based on a Delaunay triangulation.

16. The medium of claim 12 wherein step C comprises determining the chuck temperature $T_c$ and the chuck conduction coefficients $\alpha$ by minimizing the Euclidean metric $$\min \left\| \frac{dT}{dt} - k_w \nabla^2 T + k_c \alpha(T - T_c) \right\|$$

using a least squares procedure.

17. The medium of claim 12 wherein the workpiece comprises a semiconductor wafer.

18. The medium of claim 12 wherein the workpiece comprises a semiconductor wafer, a flat panel display substrate, or a lithography mask.

19. The medium of claim 12 wherein step B comprises spatially interpolating the temperatures T onto a fine spatial grid and step C comprises determining the chuck temperature $T_c$ and the chuck conduction coefficients $\alpha$ by minimizing the Euclidean metric $$\min \left\| \frac{dT}{dt} - k_w \nabla^2 T + k_c \alpha(T - T_c) \right\|$$

using a Least Squares procedure.

20. The medium of claim 12 wherein step A comprises retrieving temperature measurements from a memory storing the temperature measurements, retrieving temperature measurements from an information transfer interface, or retrieving temperature measurements via a connection with a temperature measuring device and step B comprises spatially interpolating the temperatures T onto a fine spatial grid using standard Kriging methods or linear interpolation methods based on a Delaunay triangulation.

21. The medium of claim 12 wherein step A comprises retrieving temperature measurements from a memory storing the temperature measurements, retrieving temperature measurements from an information transfer interface, or retrieving temperature measurements via a connection with a temperature measuring device; wherein step B comprises spatially interpolating the temperatures T onto a fine spatial grid using standard Kriging methods or linear interpolation methods based on a Delaunay triangulation; wherein step C comprises determining the chuck temperature $T_c$ and the chuck conduction coefficients $\alpha$ by minimizing the Euclidean metric $$\min \left\| \frac{dT}{dt} - k_w \nabla^2 T + k_c \alpha(T - T_c) \right\|$$

using a least squares procedure; wherein the workpiece comprises a semiconductor wafer; and wherein the workpiece comprises a semiconductor wafer, a flat panel display substrate, or a lithography mask.

* * * * *